T. M. WILKINS.
DIAPHRAGM.
APPLICATION FILED MAY 5, 1911.
1,057,196.
Patented Mar. 25, 1913.
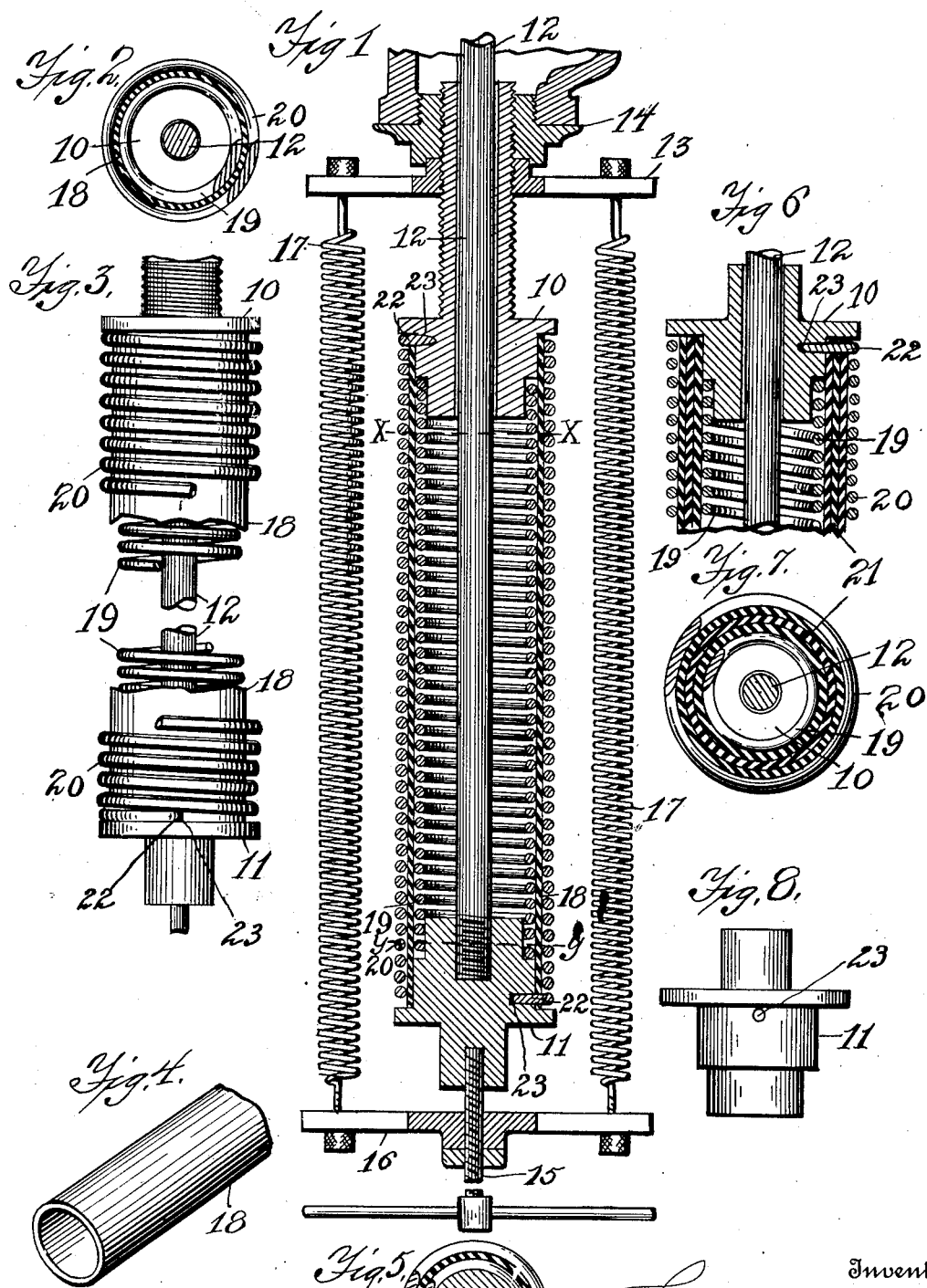
Witnesses
Carl O. Hultgren
H. U. Harris
Inventor
Thomas M. Wilkins
By S. Arthur Baldwin
Attorney

UNITED STATES PATENT OFFICE.

THOMAS M. WILKINS, OF EAST RANDOLPH, NEW YORK, ASSIGNOR TO WILKINS VALVE COMPANY, OF SALAMANCA, NEW YORK, A CORPORATION OF NEW YORK.

DIAPHRAGM.

1,057,196.    Specification of Letters Patent.    Patented Mar. 25, 1913.

Application filed May 5, 1911. Serial No. 625,353.

*To all whom it may concern:*

Be it known that I, THOMAS M. WILKINS, a citizen of the United States, and resident of East Randolph, in the county of Cattaraugus and State of New York, have invented new and useful Improvements in Diaphragms, of which the following, taken in connection with the accompanying drawings, is a specification.

The invention relates to diaphragms for regulating valves, dampers, barometers and such other instruments or devices as require a sensitive diaphragm; and the object of my improvement is to provide a tubular diaphragm which may be used either with outer or inner pressure which is exceedingly sensitive and of a cheap and durable construction, and the invention consists in the construction and arrangement of the parts as described in this specification and shown in the accompanying drawings, and pointed out in the claims.

In the drawings Figure 1 is a lengthwise sectional view of the diaphragm showing the means of adjusting and giving tension to the same. Fig. 2 is a crosswise sectional view at line X X in Fig. 1. Fig. 3 is a side elevation of the diaphragm with the middle portion broken away showing the inner and outer coil springs and the rubber tubing therebetween. Fig. 4 is a perspective view of a portion of the rubber tubing. Fig. 5 is a sectional view at line Y Y in Fig. 1. Fig. 6 is a lengthwise sectional view of the upper portion of a modification of the diaphragm showing a plurality of thicknesses of rubber tubing; and Fig. 7 shows a sectional crosswise view of the same. Fig. 8 is a side elevation of the lower supporting piece for the diaphragm.

Like numerals of reference refer to corresponding parts in the several views.

The numeral 10 designates the upper casting or supporting plug for the diaphragm and the numeral 11 designates the lower supporting plug or casting for the diaphragm. The plug 10 is cylindrical, a rod 12 passes through the plug 10, the opening in the plug 10 being larger than the rod 12 to allow the free passage of the rod. The rod 12 screws into the lower plug 11. The upper plug 10 is supported in a plate 13 to which is attached the lower plate 14 of a valve casing, or the casing for a similar device which it is desired to regulate, the rod 12 passing up into said casing. The lower plug 11 is supported on an adjusting screw 15 which passes through a yoke 16. The plate 13 and yoke 16 are connected by a plurality of coil springs 17 to adjust the tension or load of the diaphragm.

The diaphragm consists of a tube 18 of one or more thicknesses of elastic or resilient impervious material, preferably rubber, with supporting coil springs 19 and 20 on the outer and inner sides of the tube 18. The tube 18 is placed over the inner coil spring 19 and the outer coil spring 20 is slipped over the outer side of tube 18. The ends 22 of spring 20 are fastened in holes in blocks 10 and 11 to firmly attach the ends of said spring to said blocks to prevent the escape of the tubular diaphragm 18 under heavy pressures. The coil springs 19 and 20 are coiled close together to support the elastic tube 18 under heavy pressure. The inside pressure spreads the coils of the springs 19 and 20 and for outside pressure the springs 19 and 20 are held a spaced distance apart by the tension on rod 12 so that pressure from without can close the coils.

The tube 18 and springs 19 and 20 are preferably attached upon annular steps on the tube plugs 10 and 11. For interior pressure the pressure fluid enters through the opening around rod 12 in plug 10. For exterior pressure the diaphragm would be inclosed in a suitable receptacle. The inside pressure extends the tension springs 17, which springs are proportioned to the load. It is apparent that the tension of the springs 17 may be adjusted by means of screws 15 and yoke 16. The rod 12 may be a valve stem or may be attached to any other device which it is desired to regulate.

The tube 18 may be of one thickness, as shown in Fig. 1, but it is usually preferable to use a plurality of thicknesses of elastic tubing, drawing one tube over the other, as shown in Figs. 6 and 7. Three thicknesses of elastic tubing are preferred so that the central layer is protected from contact with the interior or exterior fluids, thereby retaining its elasticity for a much greater length of time. The supporting springs 19 and 20 are placed on the outer and inner sides of the plurality of thicknesses of tubing, the same as with a single thickness.

It is apparent that my resilient tubular diaphragm can be constructed to elongate or contract any desired distance by lengthening or shortening the same and by the elasticity of the tubing 18 and springs 19 and 20. The pressure fluid may be confined entirely within or entirely without the impervious tubular diaphragm, yet the construction permits of the strengthening of the diaphragm to any desired degree without losing its elasticity and consequent sensitiveness.

I claim as new:

1. A device of the class described, comprising a tubular elastic diaphragm having an opening in one end for admission to the interior thereof, and confining means for the exterior of said diaphragm permitting endwise elongation of said diaphragm from interior pressure.

2. A device of the class described, comprising a tubular diaphragm having a single opening to the interior thereof, the side walls of said tubular diaphragm elastic, and confining means for the exterior of said diaphragm permitting endwise elongation of said diaphragm from interior pressure.

3. A device of the class described, comprising an elastic tubular diaphragm, one end of said diaphragm closed and the other end having an opening therein, means in said opening for admitting fluid under pressure to the interior of said diaphragm, and confining means for the exterior of said diaphragm permitting endwise elongation of said diaphragm from interior pressure.

4. A device of the class described, comprising an elastic tubular diaphragm, one end of said diaphragm closed and the other end having an opening for admission to the interior thereof, confining means for the exterior of said diaphragm permitting endwise elongation of said diaphragm from interior pressure, and spring pressure exterior of said diaphragm to control said elongation of said diaphragm.

5. A device of the class described comprising an elastic diaphragm, and means exterior of said diaphragm for giving a tension thereto.

6. A device of the class described comprising an elastic diaphragm, a plurality of springs without said diaphragm for giving a tension to said diaphragm, and means for holding said springs.

7. A device of the character described comprising an impervious diaphragm having elastic walls and a supporting spring adjacent one or both sides of said diaphragm walls.

8. A device of the class described comprising an elastic tubular diaphragm, and resilient means for supporting the side of said elastic tubular diaphragm.

9. A device of the class described comprising an elastic tubular diaphragm, and a spiral elastic support for the side of the said elastic tubular diaphragm.

10. A device of the class described comprising an elastic tubular diaphragm, resilient means for holding said elastic tubular diaphragm, and means for giving a tension to said elastic tubular diaphragm and said resilient holding means.

11. A device of the class described comprising an elastic tubular diaphragm, supporting plugs for each end of said tubular diaphragm, and an elastic means for supporting said tubular diaphragm.

12. A device of the character described comprising an elastic tubular diaphragm, elastic supporting means for the inner and outer sides of said diaphragm, and a suitable supporting means for the ends of said diaphragm permitting its elongation and contraction.

13. A device of the class described comprising an elastic tubular diaphragm, said diaphragm composed of a plurality of thicknesses of resilient material, and means for supporting said diaphragm permitting its elongation and contraction from inner or outer pressure.

14. A device of the character described comprising an elastic impervious tubular diaphragm, supporting coiled springs on the outer and inner sides of said diaphragm, and end supports for said diaphragm and springs permitting the elongation and contraction of the same.

15. A device of the character described comprising a rubber tube, coil springs on the outer and inner sides of said rubber tube, and suitable supports attached to the ends of said coil springs and the rubber tubing permitting the contraction and elongation of the same.

16. A device of the character described comprising an elastic tubular diaphragm, interior and exterior coil springs on the outer and inner side of said tubular diaphragm, end supports attached to said tubular diaphragm and coil springs, and one of said end supports having an opening therethrough to permit interior pressure in said diaphragm.

17. A device of the character described comprising a resilient tubular diaphragm, supporting coil springs for said tubular diaphragm, end supports attached to said tubular diaphragm and coil springs, one of said end supports having an opening therethrough to permit interior pressure in said diaphragm, and an adjusting rod extending through said opening in said support and attached to the other end support to move with said diaphragm.

18. A device of the character described comprising an elastic diaphragm, supports for the ends of said elastic diaphragm permitting its elongation and contraction, a yoke attached to one of said supports by an adjusting screw, and coil springs connecting said yoke to the support at the opposite end of said diaphragm to adjust its tension by said screw.

19. A device of the character described comprising an elastic tubular diaphragm, supports for the ends of said tubular diaphragm permitting its contraction and elongation, a yoke attached to one of said supports by an adjusting screw, and springs attached to said yoke and to the support of the opposite end of said diaphragm to be adjusted by said adjusting screw.

20. A device of the character described comprising a rubber tube, supporting coil springs on the inner and outer sides of said rubber tube, end plugs for supporting said springs and rubber, one of said end plugs having an opening therethrough, a rod extending through said opening in said end plug and attached to the other end plug to move said diaphragm, a yoke attached to the solid end plug by an adjusting screw, and springs connecting said yoke and the support for the end plug, substantially as and for the purpose specified.

In testimony whereof I have signed my name to this specification in the presence of two subscribing witnesses.

THOMAS M. WILKINS.

Witnesses:
ARTHUR O. MORSE,
H. U. HARRIS.